UNITED STATES PATENT OFFICE.

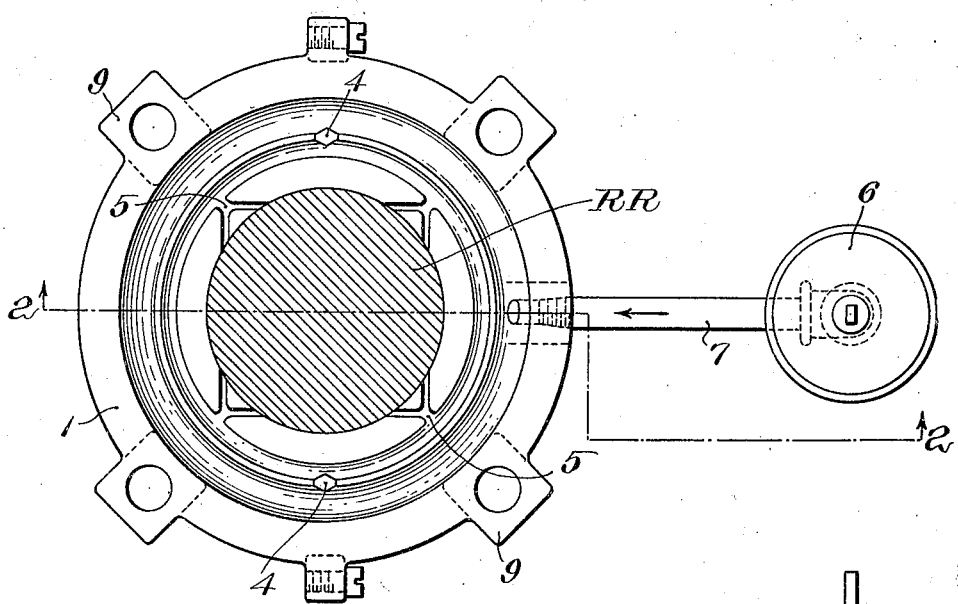
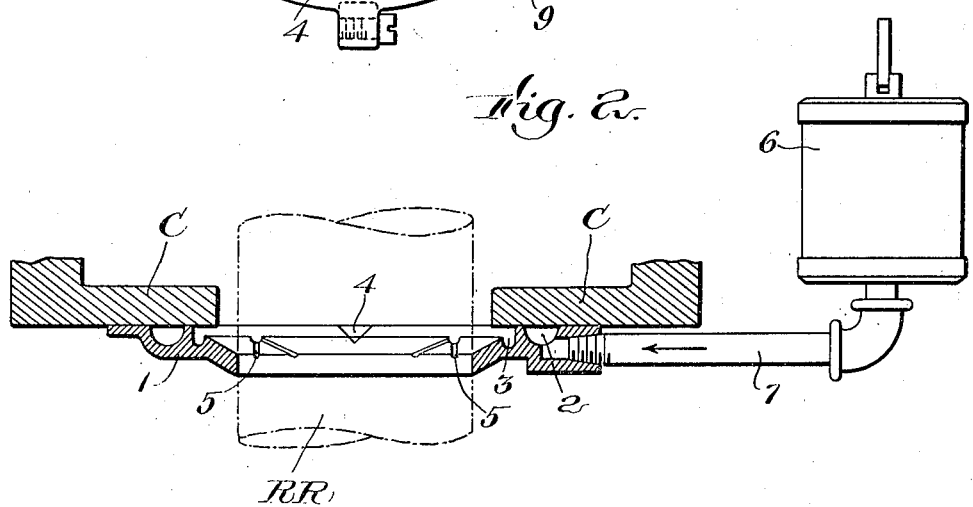

WALTER F. SOMES, OF BOSTON, MASSACHUSETTS, ASSIGNOR TO WILLIAM B. MERRILL, OF NEWTON, MASSACHUSETTS.

LUBRICATING APPARATUS.

1,342,605.   Specification of Letters Patent.   Patented June 8, 1920.

Application filed October 17, 1917.  Serial No. 197,066.

*To all whom it may concern:*

Be it known that I, WALTER F. SOMES, a citizen of the United States, and resident of Boston, in the county of Suffolk and State of Massachusetts, have invented new and useful Improvements in Lubricating Apparatus, of which the following is a specification.

This invention relates to a method of lubricating vertically reciprocating rods, such as piston rods and the like, and has for its object to effect a uniform and reliable lubrication of such rods in a simple and efficient manner.

When reciprocating rods, such as piston rods, are disposed horizontally the lubrication necessary to afford a proper operative relationship between the rods and the surrounding walls or guideways, as for example the cylinder heads, may be easily effected owing to the fact that lubricant applied to the upper sides of the rods will gravitate around the rods and lubricate all sides thereof. However, when the rods are disposed vertically the problem of uniformly and completely lubricating the rods throughout their entire peripheries becomes more difficult. If lubricant is applied to one side only, as in the case of horizontally reciprocating rods, the tendency of the lubricant to work around the rods is slight and usually is insufficient to afford satisfactory lubrication. And so far as I am aware, no means for uniformly and efficiently distributing the lubricant around vertical rods has ever been contrived. The result is that engineers have largely relied on the antiquated and inefficient method of lubricating reciprocating parts comprising grasping the reciprocating part with an oil-soaked handful of waste or otherwise manually distributing oil over the surface of such parts.

The present invention consists in automatically distributing lubricant about a vertically reciprocating member in a simple and effective manner. I provide means for feeding lubricant to the member at a plurality of points, this means having a channel at least partially surrounding the member and having ducts opening inwardly toward the member. In this way lubricant may be fed through the channel and thence through the ducts to different sides of the member. In order more effectively to distribute the lubricant I preferably provide a plurality of channels at least partially surrounding the reciprocating member and a plurality of ducts extending between the channels and the member. Both the ducts between the channels and the ducts leading to the reciprocating member are preferably spaced equidistantly around the member and the latter ducts are preferably disposed symmetrically between the former ducts. In this way lubricant from the channels will be fed in equal quantities through the respective ducts and the lubricant will be uniformly distributed around the shaft.

The lubricant may be contained solely in said channels and ducts or a reservoir may be connected to one of the channels. When employing such a reservoir it is preferably connected to the channel equidistantly from the ducts leading from the channel so that lubricant will be supplied to the respective ducts in equal quantities.

In order more fully to disclose my invention I have shown one concrete example in the accompanying drawings, in which,—

Figure 1 is a top plan view showing the reciprocating member in section; and

Fig. 2 is a longitudinal central section on line 2—2 of Fig. 1.

The particular embodiment of the invention illustrated in the drawings comprises an annular member 1 closely surrounding the reciprocating rod RR, the member 1 having lubricant channels in the form of annular grooves 2 and 3 in the upper face of the member 1. Extending between the channels 2 and 3 are openings or ducts 4, and extending inwardly from the inner channel 3 are branched ducts 5, the ducts 5 extending inwardly to the reciprocating member RR.

The ducts 4 are spaced equidistantly about the reciprocating rod and when only two ducts are provided they will therefore be 180° apart, as shown in Fig. 1. When using three they will be 120° apart, when using four they will be 90° apart, etc. The ducts 5 extending inwardly from the inner channel 3 are disposed between the openings 4 and at equal distances from the openings. Thus lubricant flowing through an opening 4 will divide equally and flow through the adjacent ducts 5, the lubricant flowing to the respective ducts 5 in equal amounts owing to the fact that the distance to each of the adjacent ducts is equal.

While the lubricant may be contained solely in the channels and ducts, I have shown a reservoir 6 communicating through pipe 7 with the outer groove 2. When employing such a reservoir it is preferably connected to the channel 2 at a point or points disposed equidistantly from the ducts 4 leading from the channel 2. In the drawings the point 8 where the pipe 7 connects with channel 2 is equidistant from ducts 4. Obviously when connecting the reservoir with only a single point of the channel 2 the side of the channel opposite to the side to which the reservoir is connected is rendered practically useless, except as a storage space for the lubricant, and this space could therefore be dispensed with without sacrificing the unique advantages of the present invention.

While the invention may be applied in many situations, as for example, above or below a cylinder, it is shown in the drawings as being applied below a cylinder, the broken members C representing portions of a cylinder casing. When applied in this environment the channels 2 and 3 are preferably made in the form of grooves on the upper surface of the member 1 and the member 1 is preferably associated with the supporting casing so that at least one of the grooves will be covered and so that neither of the grooves will be exposed to the space outside of the casing. In the illustrated embodiment lugs 9 are provided on the member 1 for the purpose of securing the member to the cylinder casing by means of machine screws or bolts.

In applying the invention to a piston rod extending upwardly instead of downwardly from a cylinder, the channels 2 and 3 and communicating ducts would preferably be provided with a suitable cover.

While any suitable lubricant may be employed, I preferably employ a lubricating oil of such consistency as will readily flow through the channels 2 and 3 and the ducts 4 and 5 by gravity. However, it is to be understood that I may introduce the lubricant to the channels and ducts under pressure, and indeed the head of oil in the reservoir 6 would produce a certain degree of pressure in the illustrated embodiment.

I claim:

1. Apparatus for lubricating a vertically reciprocating rod or the like comprising means having a plurality of channels at least partially surrounding the rod, and ducts extending between the channels and between one channel and the rod, the said ducts being distributed around the rod so that lubricant may be supplied to different sides of the rod through the channels and ducts.

2. Apparatus for lubricating a vertically reciprocating rod or the like comprising means having a plurality of channels at least partially surrounding the rod, and ducts extending between the channels and between one channel and the rod, the said ducts being symmetrically disposed around the rod so that lubricant may be uniformly distributed to the sides of the rod.

3. Apparatus for lubricating a vertically reciprocating rod or the like comprising means having a plurality of channels at least partially surrounding the rod, a set of ducts extending between the channels, and another set of ducts extending between one channel and the rod, the latter set of ducts being angularly disposed around the rod with respect to the former set of ducts.

4. Apparatus for lubricating a vertically reciprocating rod or the like comprising means having a plurality of channels at least partially surrounding the rod, a set of ducts extending between the channels, and another set of ducts extending between one channel and the rod, each set of ducts being equidistantly distributed around the rod, and the latter set of ducts being angularly disposed around the rod with respect to the former set of ducts.

5. Apparatus for lubricating a vertically reciprocating rod or the like comprising a plate surrounding the rod, the plate having on its upper side two annular grooves each extending at least partially around the rod, ducts extending between the grooves at intervals, and ducts extending between one groove and the rod intermediate the first ducts.

6. In apparatus for lubricating a vertically reciprocating rod or the like comprising a horizontal plate having an annular channel therein and having a conical surface sloping downwardly and inwardly from the channel, the conical surface having grooves therein for conducting lubricant from said channel to the rod.

Signed by me at Boston, Massachusetts, this first day of October, 1917.

WALTER F. SOMES.